Feb. 27, 1940.                E. F. NELSON                2,191,494
                              STUD WELDER
                          Filed July 5, 1938         2 Sheets-Sheet 1
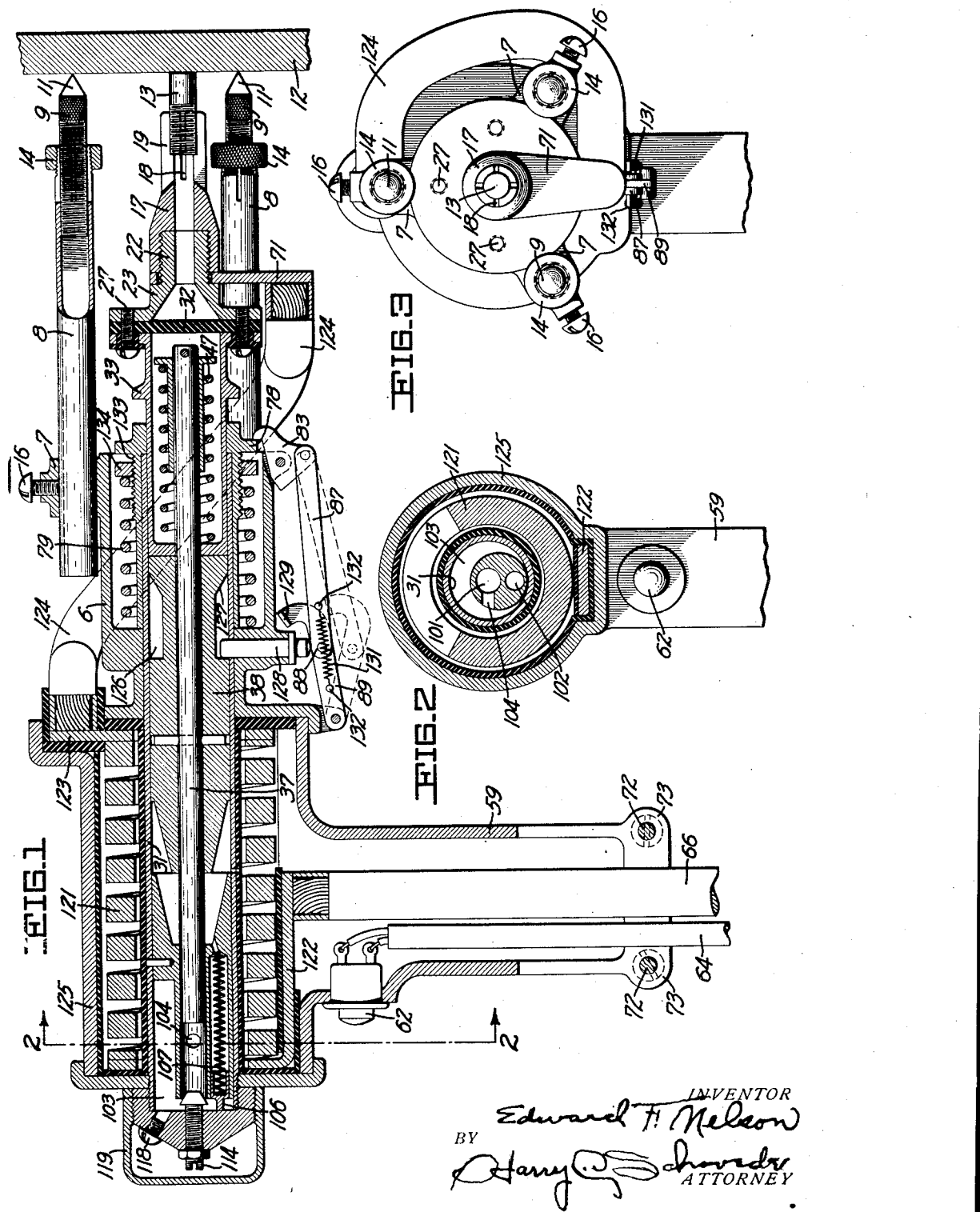
INVENTOR
Edward F. Nelson
BY
Harry C. Schroeder
ATTORNEY Feb. 27, 1940. E. F. NELSON 2,191,494
STUD WELDER
Filed July 5, 1938 2 Sheets-Sheet 2
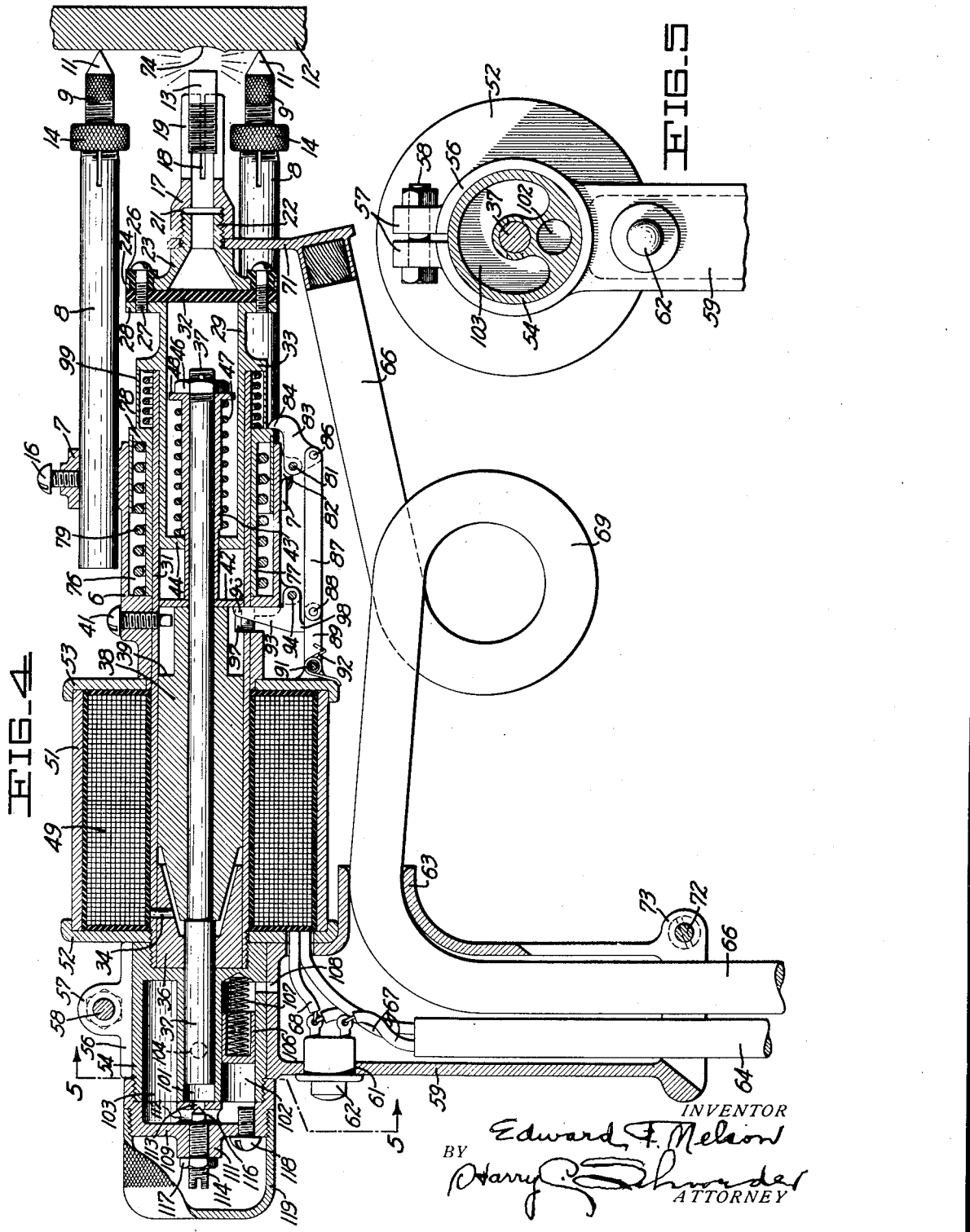
INVENTOR
Edward F. Nelson
BY
Harry C. Schrader
ATTORNEY Patented Feb. 27, 1940

2,191,494

UNITED STATES PATENT OFFICE 2,191,494

STUD WELDER

Edward F. Nelson, Vallejo, Calif.

Application July 5, 1938, Serial No. 217,345

11 Claims. (Cl. 219—4)

This invention relates to mechanisms for electric welding.

It is an object of the invention to provide improved portable apparatus for electrically butt-welding studs or other rod-like members to the surfaces of metallic objects.

Another object of the invention is to provide, in apparatus of the class described, means for electrically timing the preheating of the parts to be joined so that all welds will be uniformly alike.

A further object of the invention is to provide, in apparatus of the above-mentioned type, means for variably lengthening or shortening the operative cycle of the apparatus.

The invention possesses other objects and features of advantage some of which, together with the foregoing, will be specifically set forth in the detailed description of the invention hereunto annexed. It is to be understood that the invention is not to be limited to the specific form thereof herein shown and described as various other embodiments thereof may be employed within the scope of the appended claims.

Referring to the drawings:

Figure 1 is a vertical sectional view taken in a plane passing medially and longitudinally through one form of my stud welder.

Figure 2 is a transverse vertical sectional view of the structure illustrated in Figure 1, the plane of section being indicated by the line 2—2 of the latter figure.

Figure 3 is an end elevational view of the apparatus shown in Figure 1. A portion of the view is omitted to conserve space in the drawing.

Figure 4 is a longitudinal vertical sectional view of a stud welder embodying the preferred form of my invention. The parts of the mechanism are shown in the positions that they occupy just prior to the actual welding of a stud to the surface of a metallic object.

Figure 5 is a transverse vertical sectional view of the structure shown in Figure 4. The plane of section is illustrated by the line 5—5 of the latter figure.

Electric butt-welding of studs, or other rod-like members, to the surfaces of metallic objects has long been practiced in industry. This procedure has generally been accomplished by hand; the stud usually being held in a suitable holder which forms one terminal of the welding circuit, and the other object to which the stud is to be bonded forming the other terminal. The welder, grasping the holder in his hand, contacts the charged stud and the object surface drawing the stud away from the surface so as to create an arc. In a short time the metal of the object in the arc crater and the end of the stud will have increased in temperature to the melting point whereupon the welder quickly plunges the stud end into the arc crater, the current is turned off, and the molten metal is allowed to cool and solidify. The stud, which is now bonded to the surface of the object, may then be separated from the holder.

There are several undesirable features connected with this hand method of welding. First, it is left entirely to the discretion of the operator to determine when the respective metals of the stud and the object to which the stud is to be bonded, have reached the proper welding temperature. In a great many instances the metals are joined before they are in a molten state, thereby resulting in a faulty and easily broken weld. Secondly, even though the metals happen to be brought to the correct temperature, the stud may be plunged against the object surface slightly to one side of the arc crater thereby also resulting in a weld which does not form a proper homogeneous bond between the stud and the object. In the third instance, the length of the arc gap may vary with each weld which causes the metals to heat up faster or slower as the case may be, thereby producing welds of non-uniform strength; and, finally, but few of the studs will be found to be truly perpendicular to the surface of the object. Thus, unless excessive clearance is allowed in pre-drilled holes in planking or other articles to be attached by the studs, considerable difficulty will be experienced in readily fitting these parts together. Workmen encountering an inclined stud usually bring it into perpendicular position with the aid of several blows from a heavy hammer. This is a dangerous procedure since it is likely to fracture and seriously weaken the weld. I have provided apparatus by means of which all of these defects are remedied, which will permit the placing of studs or the like as rapidly as they have heretofore been placed by hand, and which will insure that each weld is possessed of a maximum of strength.

In detail, and referring to Figure 4 of the drawings, the preferred form of my invention comprises a cast iron casing 6 having a plurality, preferably three, of radially extending ears 7 each being bored to slidably receive a tubular leg 8. Each of the legs 8, at its distal end, is internally threaded to receive the threaded shank of a foot 9 whose pointed end 11 is adapted to bear against the surface of a metallic member 12 to which the stud 13 is to be welded. Nuts 14, which clamp the slotted ends of the legs 8 about the feet 9, serve to lock the latter once they have been adjusted to a desired position; and set screws 16 in each ear 7 serve to clamp the legs in the ears and provide for extension and retraction of the legs as desired so that the spacing between the casing 6 and the surface of the member 12 may be varied.

Means is provided for supporting the stud 13 to be welded to the member 12 for movement perpendicularly toward and from the surface of the member. Disposed centrally between the three spaced legs 8 is a tubular chuck 17, one end of which is provided with transverse slots 18 to form a plurality of fingers 19 which frictionally engage the stud 13, and the other end of which is provided with a threaded bore 21 for receiving the threaded shank 22 of a cap 23. This connection is provided, primarily, so as to permit the mounting of chucks adapted to support studs of different diameters. The cap 23 is provided with a flange 24 having therein a plurality of apertures in which are inserted insulating bushings 26 through which screws 27 pass so as to attach the cap to a flange 28 formed at one end of a tubular ram 29 which is slidably mounted for axial movement in the end of a non-ferrous tube 31. An insulating washer 32, interposed between the flanges 24 and 28, serves, in conjunction with the bushings 26, to electrically insulate the stud 13 from the ram 29. Since the ram is slidable axially of the tube, the stud 13, during such movement of the ram, will be moved away from and into spaced relation wtih the surface of the member 12. To limit this movement of the stud so that the gap between the end thereof and the surface of the member 12 will be held at approximately one-fourth of an inch, a collar 33 is provided on the ram which impinges against the end of the tube 31.

Electro-magnetic means is provided for effecting movement of the ram in the tube 31. Secured in the opposite end of the tube in any suitable manner, such as by means of the pin 34, is an iron pole-piece 36 which is centrally bored to slidably journal a rod 37, the latter extending concentrically along the tube. The rod 37, adjacent the pole-piece, is shouldered and against this shoulder abuts one end of an iron armature 38 which is slidable, with the rod, in the tube 31. The opposite end of the armature is reduced in diameter to provide an abutment 39 which may strike against the end of a screw 41 threaded through the casing 6 and projecting into the bore of the tube 31, so as to limit movement of the armature in one direction. A washer 42, which lies against the end of the armature, is provided on the rod, as is also a ferrule 43 which, at one end contacts the washer 42, and at the other end terminates adjacent the end of the rod, and passes slidably through an aperture formed in the end wall 44 of the ram 29. A nut 46, threaded on the end of the rod 37, serves to clamp the armature 38, the washer 42 and the ferrule 43 together as a unit on the rod so that all may move together with the latter. A coil spring 47 surrounds the ferrule and is interposed between the end wall 44 of the ram and a flange 48 formed at the end of the ferrule adjacent the nut 46.

Surrounding the end of the tube 31, in which the polepiece 36 is positioned, is an actuating coil 49 enclosed by a ferrous shell 51 and end plates 52 and 53; and a ferrous housing 54, threaded onto the end of the tube 31, and contacting the pole-piece 36, serves to clamp the end plates against the shell 51 and the end plate 53 against a suitable shoulder therefor provided on the casing 6. A magnetic circuit is thus provided, through which flux may flow when the coil 49 is excited, comprising the pole-piece 36, the housing 54, the end plate 52, the shell 51, the end plate 53, the casing 6, and the armature 38.

Surrounding the housing 54 is a split sleeve 56 having a pair of apertured ears 57 rising therefrom through which passes a bolt 58 by means of which the sleeve may be clamped, immovably, to the housing. Formed integrally with and extending radially from the sleeve 56 is a hollow handle 59 provided with an aperture 61 in which is inserted a pushbutton switch 62, and with a tubular spout-like projection 63. A pair of cables 64 and 66 enter the extreme end of the handle, through suitable apertures provided therein, the former of which contains three conductors 67, a pair of which are connected with the respective terminals of the push-button switch 62 and another of which is connected with one end of the actuating coil 49. An additional conductor 68 connects the other end of the coil 49 with one of the terminals of the switch 62. The conductor 66 is brought out of the handle through the tubular projection 63, is provided with a loop 69 so as to insure ready flexing of the conductor and is connected to a connector lug 71 which is secured on the shank 22 by pressure of the chuck body 17. The end of the handle 59 is provided with a saw slot passing transversely through the entrance apertures of the cables 64 and 66, and a bolt 72, which passes through apertured ears 73 formed at the end of the handle, serves to clamp the cables immovably in the handle.

The normal position of the ram 29 and the stud 13, just prior to the welding of the stud to the surface of the member 12, is as shown in Figure 1 wherein the end of the stud rests on the surface of the member and the collar 33 of the ram, in Figure 4, is spaced about one-fourth of an inch to the right of the end of the tube 31. After positioning the apparatus, so that the stud is located over the spot on the member 12 to which it is to be welded and all of the feet 11 are resting against the surface of the member so as to insure perpendicularity of the stud, the operator depresses the pushbutton switch 62. This causes a flow of current through the actuating coil 49 and simultaneously closes a control relay or circuit breaker on the welding current generator, not shown, which institutes a flow of current in the cable 66. This heavy welding current passes through the stud 13, the member 12, and back to the generator by means of a cable, not shown, which connects the member 12 and the generator. As soon as the actuating coil 49 becomes energized, the flux created in the magnetic circuit thereof will attract the armature 38 toward the pole-piece 36. This will, through the connection between the rod 37 and the ram 29, move the ram and the stud away from the surface of the member 12. As soon as the contact between the end of the stud and the surface of the member 12 is broken, an arc will be struck therebetween which will rapidly raise the temperatures of the end of the stud and that area of the member in the arc crater 74 to the melting point. The ram and the stud will, under the pull of the moving armature 38, continue to move away from the member 12 until the collar 33 of the ram impinges against the end of the tube 31.

31 whereupon further movement of the ram and stud will cease.

Means is provided, operative after the arc between the stud and the member 12 has been established for an interval of time, for quickly plunging the molten end of the stud into the arc crater created in the surface of the member. Formed in the casing 6 is a recess 76 in which, and slidable along the tube 31, is a plunger 77 having thereon a flange 78 and between the flange and the bottom of the recess is interposed a relatively heavy coil spring 79. The spring 79 tends to project the plunger outwardly from the recess toward the end of the tube 31. Hinged, by a pivot pin 81 supported by lugs 82 provided on the exterior of the casing 6, is a latch trigger 83, the pawl 84 of which engages a surface of the plunger flange 78. The latch trigger has connected thereto, by a pivot pin 86, one end of a connecting rod 87, the other end of the latter being pivotally joined by means of a pivot pin 88 with an end of a lever 89 which is mounted, by a pivot pin 91, on the end plate 53. A torsion spring 92, engaging at its respective ends the end plate 53 and the lever 89, tends to flex the articulated member, formed by the lever and the connecting rod 87, upwardly toward the axis of the plunger. A trip lever 93, which is pivotally mounted on the casing 6 by means of a pivot pin 94, is provided with an arm 96, which extends into the bore of the tube 31 through alined apertures 97 formed in the tube and the casing 6, and with a relatively shorter arm 98 which rests on the upper side-edge of the lever 89. The arrangement of the parts is such that when one side of the arm 96 of the trip lever 93 is in its normal position, engaging the stop therefor provided by one side of the apertures 97, the articulated link formed by the lever 89 and the connecting rod 87 will be restrained, due to being in engagement with the end of the trip lever arm 98, from flexing upwardly beyond a straight line passing through each of the pivot pins 86, 88 and 91. Thus the latch trigger 83 may not swing about its pivot pin 81 while the link 87—89 is on dead center and consequently the trigger pawl 84, since it engages the plunger flange 78, will maintain the plunger retracted and the spring 79 under compression.

After the arc between the stud 13 and the member 12 has been struck, as was explained above, the ram 29 moves until it contacts the end of the tube 31 whereupon it stops. The armature 38, however, continues to move toward the pole-piece 36, compressing the spring 47 in so doing, and advancing the washer 42 along the tube 31 toward the projecting end of the trip lever arm 96. When the washer contacts the end of the arm, continued movement of the armature will cause the trip lever to swing about the axis of its pivot pin 94 thereby causing the end of the arm 98 to flex the articulated link 87—89 downwardly. As soon as the axis of the intermediate pivot pin 88 passes out of planar alinement with the axes of the pivot pins 86 and 91, the force exerted on the latch lever 83 by the compressed spring 79 will cause the latter lever, since it is no longer restrained from movement by the articulated link, to swing downwardly thereby releasing the plunger and allowing the spring 79 to suddenly project the plunger and the ram 29, which is connected to the plunger by means of a tubular extension 99 of the plunger, toward the member 12 thereby plunging the molten end of the stud 13 into the molten metal of arc crater 74. The operator now releases the pushbutton 62 to shut off the welding current and the current flowing in the actuating coil 49 and pulls the apparatus outwardly away from the member 12 so as to strip the chuck 17 from the stud.

Means is provided for variably regulating the extent of the interval of time between establishment of the welding arc and the release of the mechanism to plunge the stud into the arc crater so that the latter step may be made to occur exactly at the instant that the two metals to be joined have reached the correct temperature. In the housing 54 are provided a pair of parallel bores 101 and 102, the former of which is concentric with the housing axis, and a portion of the housing is hollowed out to provide a chamber 103. Apertures 104 provide communication between the chamber and the bore 101. The bore 101 acts as a dashpot cylinder and the end of the rod 37 extends thereinto to serve as a piston, while the bore 102 is provided with a piston 106 normally pressed by a coil spring 107 toward one end of the bore, and is vented to the atmosphere on the spring side of the piston, by means of a passage 108 opening into the hollow handle 59. A cap 109 is threadedly engaged with and closes the open end of the housing 54 and a hub 111 formed thereon has an extension which overlies and closes the end of the cylinder bore 101. The hub 111 is axially bored and provided, within the chamber 103, with an intersecting passage 112 which divides the hub bore into a pair of individual portions one of which provides a bleeder opening 113 at the end of the cylinder bore 101 and the other of which is threaded to receive the threaded stem 114 of a needle valve 116 whose conical point may be made, by rotating the threaded stem 114, to advance toward or recede from the opening 113. A lock nut 117 is provided on the valve stem 114 so that the latter may be locked in any position to which it is adjusted. The chamber 101 is entirely filled with fluid, preferably a light oil, through a suitable filler opening closed by a screw 118, and a cover 119 is threadedly engaged with the cap 109 so as to protect the valve stem 114 against being disturbed or damaged by accidental blows. The screw 118, which acts as the filler opening plug, is extended inwardly to serve as a stop for the piston 106 so as to prevent the latter from issuing too far out of the bore 102.

When the actuating coil 49 is deenergized, prior to welding a stud 13 to the member 12, the armature 38 will rest at a remote position with respect to the pole-piece 36 and the end of the rod 37 within the cylinder bore 101 will be positioned approximately one-fourth of an inch to the right of the left-hand side of the openings 104 as viewed in Figure 4. This will allow fluid from the chamber 103 to enter and fill the cylinder bore 101 through the apertures 104. As soon as the coil 49 is energized, the rod 37 will move to the left across the openings 104. This will force fluid contained in the cylinder bore back through the openings 104 into the chamber 103 and, since the travel of the end of the rod required to traverse and close the openings 104 is one-fourth of an inch, the separation of the stud 13 and the member 12 will occur practically instantaneously since no resistance to this primary movement is offered by the fluid in the cylinder bore 101. From this point on, however, continued movement of the rod 37 axially of the cylinder bore is resisted since the only avenue of escape for the fluid is through the restricted bleeder opening 113. The valve 116 may be set to render the area of the bleeder opening as small or as large as desired so that the rate of progression of the rod or piston along the cylinder bore will be correspondingly affected. This governing of movement of the rod 37 will, of course, also govern the rate of speed at which the washer 42 approaches the projecting end 96 of the trip lever and as a result the time elapsing between establishment of the welding arc and the release of the stud to return it into the arc crater in the member 12 may be adjustably and precisely varied. This time for all practical purposes does not exceed more than a few seconds. The movable piston 106, in the bore 102, provides for resilient enlargement of the volume of the chamber 103 to accommodate the fluid that is forced from the cylinder bore 101 during advancement of the rod 37 and also creates, through the medium of the spring 107, pressure on the fluid in the chamber which assists in returning the rod 37, and the parts of the apparatus connected for movement therewith to their normal positions when the actuating coil 49 is deenergized.

In Figure 1, I have illustrated a modified form of apparatus, the latter being shown with the parts in operative relation just prior to making a weld. While the majority of parts are functionally identical with those of the preferred form of Figure 4, and bear the same reference numerals, there are several important differences of construction. In the apparatus of Figure 4, a separate source of preferably direct current is necessary in the welding generator to excite the actuating coil 49. There are, however, several types of welding machines which afford no current other than the heavy welding current. It is to accommodate these latter machines that I replace the actuating coil 49 with a coil constructed of helically arranged convolutions of heavy copper bar 121, one end of the coil being connected by a buss bar 122 with the welding current input lead 66 and the other end of the coil being connected by a buss bar 123 with an end of a heavy jumper lead 124, the other end of the latter being connected, as usual, with the connector lug 71. Thus the actuating coil is in series with the welding circuit through the stud 13 and the member 12 and carries the full welding current. As the time required to make a weld is very short and as a longer interval of time is required to load another stud into the chuck and reset the mechanism, and in which the parts may cool off, the heavy current passing through the coil will not cause the adjacent metallic parts to become uncomfortably hot. The coil is enclosed in a ferrous housing 125 formed integrally with the handle 59.

The second constructional difference is in the trip mechanism. The armature 38 is here extended and provided with a peripheral groove 126 having an inclined side 127 which, as the armature moves toward the left, contacts and depresses a pin 128 entering the bore of the tube 31 radially through the casing 6, which pin causes flexing of the articulated link to release the latch 83. The link is provided with the usual connecting rod 87, but the lever 89 is extended beyond the pivot pin 88 and provided with an overhanging lug 129 which rests against the side edge of the connecting rod 87 when the link is fully depressed to provide a stop. Instead of the torsion spring 92, shown in Figure 4, a coil tension spring 131 is provided, attached to anchor pins 132 on the lever 89 and connecting rod 87 respectively. The arrangement of the articulated link is such that, when in either set or released position, the lever 89 and the connecting rod 87 will lie in angular relationship and the axis of the spring 131 will lie in a position offset with relation to the axis of the pivot pin 88. This arrangement of the spring will cause the link to snap from one operative position to the other.

The third constructional difference is in the plunger 77. In Figure 1, the outer periphery of the plunger is provided with screw threads 133 which receive a nut 134. This nut may be rotated to advance it axially of the plunger so as to compress the spring 79 and thereby provide for more forcible movement of the stud 13 into the arc crater 74.

While the greater part of the operation of the stud welder of my invention is entirely automatic, there is one step, other than loading additional studs into the chuck, and depressing the operating pushbutton, that must be performed manually. The mechanism requires "cocking" between each weld; that is, the plunger 77, after being released by the latch 83, must be returned to be held by the latch before the next welding operation may be successfully performed. This "cocking" may be accomplished, before or after an additional stud has been inserted in the chuck, by placing the end of the chuck or stud against a projecting object and pressing the body of the stud welder toward the object. This will cause the ram 29 to be moved axially whereupon it will contact the plunger and carry the latter along with it until the flange 78 coincides with the latch 83. When this occurs, the latch pawl 84 will snap upwardly to contact the side of the flange, the plunger being thereafter held in this position until it is released by operation of the trip lever.

I claim:

1. Apparatus for welding a member forming one electrode of an electric welding circuit to another member forming another electrode thereof, comprising means for movably supporting and releasably engaging one of said electrodes, means for moving said one of the electrodes away from the other of said electrodes to establish an arc gap between said electrodes, and means operative a predetermined interval of time after establishment of said arc gap for releasing said one of the electrodes from said movable supporting means to suddenly bring said electrodes together.

2. Apparatus for welding a member forming one electrode of an electric welding circuit to another member forming another electrode thereof, comprising means for movably supporting one of said electrodes, electromagnetic means for moving said one of the electrodes in one direction away from the other of said electrodes so as to establish an arc gap between said electrodes, and means operative during movement of said one of the electrodes in said one direction and independent of said electromagnetic moving means for moving said movable electrode in an opposite direction.

3. Apparatus for welding a member forming one electrode of an electric welding circuit to another member forming another electrode thereof, comprising axially extensible means for movably supporting one of said electrodes, electromagnetic means for moving said one of the electrodes and its support in one direction away from the other of said electrodes to establish an arc gap between said electrodes, and spring-pressed means operative a preset interval of time after establishment of said arc gap and during continued movement of said electrode support for returning said separated electrodes into mutual contact.

4. Apparatus for welding a member forming one electrode of an electric welding circuit to another member forming another electrode thereof, comprising a support removably engaging one of said electrodes, means on said support for holding the other of said electrodes, primary means for moving said electrode holding means and the electrode held thereby away from said first-mentioned electrode whereby an electric arc is established between the separated electrodes, normally restrained secondary means for bringing said electrodes together after separation thereof, and means operative during movement of said primary electrode moving means for releasing said restrained secondary means for bringing said electrodes together.

5. Apparatus for welding a member forming one electrode of an electric welding circuit to another member forming another electrode thereof, comprising a support removably engaging one of said electrodes, means on said support for holding the other of said electrodes, primary means for moving said electrode holding means and the electrode held thereby away from said first-mentioned electrode whereby an electric arc is established between the separated electrodes, normally restrained secondary means relatively axially movable with respect to said primary electrode-moving means for bringing said electrodes together after separation thereof, means operative during movement of said primary electrode moving means for releasing said restrained secondary means for bringing said electrodes together, and means for yieldably restraining movement of said primary moving means.

6. Apparatus for welding a member forming one electrode of an electric welding circuit to another member forming another electrode thereof, comprising a support removably engaging one of said electrodes, means on said support for holding the other of said electrodes, primary means for moving said electrode holding means and the electrode held thereby away from said first-mentioned electrode whereby an electric arc is established between the separated electrodes, normally restrained secondary means relatively axially movable with respect to said primary electrode-moving means for bringing said electrodes together after separation thereof, means operative during movement of said primary electrode moving means for releasing said restrained secondary means for bringing said electrodes together, and adjustable means for variably yieldably restraining movement of said primary moving means.

7. Apparatus for welding a member forming one electrode of an electric welding circuit to another member forming another electrode thereof, comprising a casing, means for removably supporting said casing adjacent and in spaced relation to a first of said electrodes, a ram mounted for movement in said casing in a direction away from said first electrode, means on said ram for holding a second electrode to be moved, upon movement of said ram, from a position contacting said first electrode to a position spaced therefrom whereby an electric arc is established between said electrodes, means in said casing for moving said ram, restrained pressure means in said casing and engaging said ram for moving said second electrode into engagement with said first electrode after the establishment of said electric arc therebetween, and means connected to be actuated by said ram moving means for releasing said restrained pressure means.

8. Apparatus for welding a member forming one electrode of an electric welding circuit to another member forming another electrode thereof, comprising a casing, means for removably supporting said casing adjacent and in spaced relation to a first of said electrodes, a ram mounted for movement in said casing in a direction away from said first electrode, means on said ram for holding a second electrode to be moved, upon movement of said ram, from a position contacting said first electrode to a position spaced therefrom whereby an electric arc is established between said electrodes, elements providing a magnetic circuit including an armature connected and movable with said ram, means for creating magnetic flux in said magnetic circuit to move said armature and ram, a plunger adjacent said ram and movable in a direction counter to the direction of movement of said ram, said plunger being operatively connected to said ram to impart counter movement to the latter, pressure means for moving said plunger, releasable means for holding said plunger against movement, and means engageable by and during movement of said armature for releasing said plunger holding means.

9. Apparatus for welding a member forming one electrode of an electric welding circuit to another member forming another electrode thereof, comprising a casing, means for removably supporting said casing adjacent and in spaced relation to a first of said electrodes, a ram mounted for movement in said casing in a direction away from said first electrode, means on said ram for holding a second electrode to be moved, upon movement of said ram, from a position contacting said first electrode to a position spaced therefrom whereby an electric arc is established between said electrodes, elements providing a magnetic circuit including an armature connected and movable with said ram, means for creating magnetic flux in said magnetic circuit to move said armature and ram, a plunger adjacent said ram and movable in a direction counter to the direction of movement of said ram, said plunger being operatively connected to said ram to impart counter movement to the latter, a compressible spring interposed between said casing and said plunger for moving the latter, a releasable latch on said casing and engaging said plunger for maintaining said spring in compression, and mechanism including a trip lever operatively connected with said latch, said trip lever being disposed in the path of movement of said armature whereby the movement of said armature may release said latch.

10. Apparatus for welding a member forming one electrode of an electric welding circuit to another member forming another electrode thereof, comprising a casing, means for removably supporting said casing adjacent and in spaced relation to a first of said electrodes, a ram mounted for movement in said casing in a direction away from said first electrode, means on said ram for holding a second electrode to be moved, upon movement of said ram, from a position contacting said first electrode to a position spaced therefrom whereby an electric arc is established between said electrodes, elements providing a magnetic circuit including an armature connected and movable with said ram, means for creating magnetic flux in said magnetic circuit to move said armature and ram, a plunger adjacent said ram and movable in a direction counter to the direction of movement of said ram, said plunger being operatively connected to said ram to impart counter movement to the latter, pressure means for moving said plunger, releasable means for holding said plunger against movement, means engageable by and during movement of said armature for releasing said plunger holding means, a housing fixed to said casing, said housing having a bore therein provided with a vent aperture, a rod secured to said armature and slidably entering said housing bore, means for admitting fluid into said housing bore to be forced through said vent aperture upon movement of said rod in said bore by said armature, and means for variably obstructing passage of said fluid through said vent aperture.

11. Apparatus for welding a member forming one electrode of an electric welding circuit to another member forming another electrode thereof, comprising a casing, means for removably supporting said casing adjacent and in spaced relation to a first of said electrodes, a ram mounted for movement in said casing in a direction away from said first electrode, means on said ram for holding a second electrode to be moved, upon movement of said ram, from a position contacting said first electrode to a position spaced therefrom whereby an electric arc is established between said electrodes, elements providing a magnetic circuit including an armature connected and movable with said ram, means for creating magnetic flux in said magnetic circuit to move said armature and ram, a plunger adjacent said ram and movable in a direction counter to the direction of movement of said ram, said plunger being operatively connected to said ram to impart counter movement to the latter, pressure means for moving said plunger, releasable means for holding said plunger against movement, means engageable by and during movement of said armature for releasing said plunger holding means, a housing fixed to said casing, said housing having first and second bores therein, a chamber for containing fluid and ports providing communication between said chamber and said first bore, a cover on said housing having an extended portion closing said first bore and having therein an opening to provide a vent for said first bore, a rod, secured to and movable with said armature, slidably entering said first bore, the end of said rod having its normal position of rest beyond said ports and said vent opening of said first bore whereby said ports are uncovered to admit fluid from said chamber into said first bore, said rod upon being moved along said first bore, by said armature, forcing fluid contained in said latter bore through said vent opening into said chamber, a valve in said housing cover for variably obstructing said vent opening, and a spring resisted piston in and movable axially of said second bore as fluid is forced into said chamber from said first bore.

EDWARD F. NELSON.